(12) United States Patent
Van Deun

(10) Patent No.: US 9,977,993 B2
(45) Date of Patent: May 22, 2018

(54) SYSTEM AND METHOD FOR CONSTRUCTING A STATISTICAL SHAPE MODEL

(71) Applicant: Materialise N.V., Leuven (BE)

(72) Inventor: Joris Van Deun, Leuven (BE)

(73) Assignee: Materialise N.V., Leuven (BE)

( * ) Notice: Subject to any disclaimer, the term of this patent is extended or adjusted under 35 U.S.C. 154(b) by 2 days.

(21) Appl. No.: 15/159,541

(22) Filed: May 19, 2016

(65) Prior Publication Data

US 2016/0267352 A1    Sep. 15, 2016

Related U.S. Application Data

(63) Continuation of application No. PCT/EP2014/075343, filed on Nov. 21, 2014.

(30) Foreign Application Priority Data

Nov. 22, 2013  (GB) .................... 1320688.3

(51) Int. Cl.
  *G06K 9/46*  (2006.01)
  *G06K 9/62*  (2006.01)
  *G06K 9/48*  (2006.01)

(52) U.S. Cl.
  CPC .......... *G06K 9/6209* (2013.01); *G06K 9/48* (2013.01); *G06K 9/6206* (2013.01); *G06K 9/6255* (2013.01); *G06K 2009/487* (2013.01)

(58) Field of Classification Search
  CPC .. G06K 9/6206; G06K 9/6255; G06K 9/6209; G06K 9/48; G06K 9/52; G06K 9/62; G06K 9/4604; G06K 9/643
  See application file for complete search history.

(56) References Cited

U.S. PATENT DOCUMENTS

| 5,926,568 A * | 7/1999 | Chaney ................ G06K 9/6206 382/128 |
| 7,558,402 B2 * | 7/2009 | Zhou .................... G06K 9/3216 382/103 |
| 7,965,869 B2 * | 6/2011 | Zhou .................... G06K 9/6206 382/103 |
| 2006/0267978 A1 | 11/2006 | Litke et al. |

(Continued)

OTHER PUBLICATIONS

Joan Glaunes et al: "Landmark Matching via Large Deformation Diffeomorphisms on the Sphere", Journal of Mathematical Imaging and Vision, Kluwer Academic Publishers, 80, vol. 20, No. 1-2, Jan. 1, 2004, pp. 179-200.

(Continued)

*Primary Examiner* — Amir Alavi
(74) *Attorney, Agent, or Firm* — Patterson & Sheridan LLP

(57) ABSTRACT

Systems and methods are provided for constructing a statistical shape model from a set of training shapes. In one embodiment, two shapes in the training set can be parameterized to a common base domain. Correspondence between the shapes can be evaluated using shape-specific data, such as, for the case of anatomical shapes, anatomical curves and/or anatomical landmarks. In evaluating correspondence, the shape-specific data about the second shape can be mapped to the shape-specific data about the first shape, and the mapping can be optimized based at least in part on a deformation energy of the mapping.

20 Claims, 7 Drawing Sheets

(56) References Cited

U.S. PATENT DOCUMENTS

| | | | |
|---|---|---|---|
| 2007/0014457 A1* | 1/2007 | Jolly | G06T 7/155 382/128 |
| 2007/0031003 A1* | 2/2007 | Cremers | G06K 9/6207 382/103 |
| 2008/0144939 A1* | 6/2008 | Russakoff | G06K 9/6209 382/190 |
| 2008/0144940 A1* | 6/2008 | Russakoff | G06K 9/6209 382/203 |
| 2009/0052756 A1* | 2/2009 | Saddi | G06K 9/6209 382/131 |
| 2016/0267352 A1* | 9/2016 | Van Deun | G06K 9/6206 |

OTHER PUBLICATIONS

PCT Search Report dated Mar. 13, 2015 in corresponding PCT Application.
UKIPO Search Report dated May 20, 2014 in priority application GB1320688.3.

* cited by examiner

SYSTEM AND METHOD FOR CONSTRUCTING A STATISTICAL SHAPE MODEL

CROSS-REFERENCE TO RELATED APPLICATIONS

This application is a continuation under 35 U.S.C. § 120 of International Application No. PCT/EP2014/075343, filed Nov. 21, 2014 (and published by the International Bureau as International Publication No. WO2015/075211 on May 28, 2015), which claims priority to GB Application No. 1320688.3, filed Nov. 22, 2013. Each of the above referenced patent applications is hereby incorporated by reference.

BACKGROUND OF THE INVENTION

Field of the Invention

This application relates to statistical shape models. More particularly, this application relates to establishing correspondence between training shapes when constructing a statistical shape model.

Description of the Related Technology

Statistical models of shape have been used for some time to provide automated interpretation of images. The basic idea used by the models is to establish, from a training set, a pattern of "legal" variation in the shapes and spatial relationships of structures in a given class of images (the class of images may be for example face images, hand images, etc.). Statistical analysis is used to give an efficient parameterization of the pattern of legal variation, providing a compact representation of shape. The statistical analysis also provides shape constraints which are used to determine whether the shape of a structure in an analyzed image is a plausible example of the object class of interest.

One aspect of developing a statistical shape model is to establish, during training, dense correspondence between shape boundaries for a reasonably large set of example images. It is important to establish the "correct" correspondence, i.e., a landmark should represent the same location for each of the images used to generate the model (for example a landmark could be located at the inner corner of the left eye). If "correct" correspondences are not established, an inefficient model of shape can result, leading to difficulty in defining shape constraints. In other words, the model will not correctly determine whether the shape of a hypothetical structure in an analyzed image represents a plausible example of the object class of interest.

The problem of establishing correspondence can be viewed as one of finding an appropriate parameterization of the shape. The term parameterization refers to the process of defining a one-to-one correspondence between values of one or more parameters and position on the shape so that a given value of the parameter (or parameters) defines a unique location on the shape. For example, a single parameter can define position around a closed boundary, while two parameters are required to define position on a closed surface (in 3D) of spherical topology.

In practice, correspondence has been established for training images by using manually defined "landmarks". In 2D this defines a piecewise linear parameterization of each shape, with equivalent landmarks for the different shapes corresponding by definition and intermediate sections of shape boundary parameterized as a linear function of path length. Shape models generated in this way have been found to function reasonably well.

SUMMARY

In accordance with embodiments of the present invention, there is provided a system, a method, and a computer-readable medium carrying instructions for constructing a statistical shape model from a set of training shapes according to the appended claims.

More specifically, in a first aspect of the invention there is provided a system for constructing a statistical shape model from a set of training shapes. The system can include database configured to store a set of training shape images, an image processing module configured to parameterize a first shape and a second shape in the set of training shapes to a common base domain, and an analysis module configured to evaluate correspondence between the first and second shapes using shape-specific data about the first shape and shape-specific data about the second shape. Evaluating correspondence can include mapping the shape-specific data about the second shape to the shape-specific data about the first shape, and optimizing the mapping based at least in part on a deformation energy of the mapping. In some embodiments the common base domain may be a two dimensional (2D) common based domain. In other embodiments the common base domain may be a three dimensional (3D) common base domain. The common base domain may be spherical. Evaluating the correspondence may include defining a diffeomorphism. The shape-specific data may include anatomical information. The shape-specific data may include curves. The curves may be closed curves. The shape-specific data may include curves and/or points. The image processing module may be configured to parameterize a third shape in the set of training shapes to the common base domain. In such an embodiment, the analysis module may be configured to evaluate correspondence between the first and third shapes using shape-specific data about the first shape and shape-specific data about the third shape, and evaluating correspondence may include mapping the shape-specific data about the third shape to the shape-specific data about the first shape and optimizing the mapping based at least in part on a deformation energy of the mapping.

Another aspect of the invention provides a computer implemented method of constructing a statistical shape model from a set of training shapes. The method can include parameterizing a first shape and a second shape in the set of training shapes to a common base domain and evaluating correspondence between the first and second shapes using shape-specific data about the first shape and shape-specific data about the second shape. Evaluating correspondence can include mapping the shape-specific data about the second shape to the shape-specific data about the first shape, and optimizing the mapping based at least in part on a deformation energy of the mapping. In some embodiments the common base domain may be a two dimensional (2D) common based domain. In other embodiments the common base domain may be a three dimensional (3D) common base domain. The mapping of the shape-specific data may include defining a diffeomorphism. The common base domain may be spherical. In embodiments, the shape-specific data may include anatomical information. The shape-specific data may include curves. In such embodiments, optimizing the mapping may be based at least in part on points sampled from each curve. The curves may be closed curves. The shape-specific data may include curves and/or points. The method may include repeating the parameterizing and evaluating steps for the first shape and a third shape in the set of training shapes.

Another aspect of the invention provides a computer readable medium, such as a non-transitory computer readable medium, comprising computer executable instructions stored thereon which when executed by a processor cause a computer to perform a method of constructing a statistical shape model from a set of training shapes. The method can include parameterizing first and second shapes in the set of training shapes to a common base domain and evaluating correspondence between the first and second shapes using shape-specific data about the first shape and shape-specific data about the second shape. Evaluating correspondence can include mapping the shape-specific data about the second shape to the shape-specific data about the first shape and optimizing the mapping based at least in part on a deformation energy of the mapping.

DETAILED DESCRIPTION OF CERTAIN INVENTIVE EMBODIMENTS

The inventor of the embodiments described herein has developed a useful approach to constructing a statistical shape model having increased stability, smoothness, and flexibility over conventional methods. In accordance with various embodiments, a system and method are provided which construct a statistical shape model by parameterizing at least two shapes in a set of training shapes to a common base domain, and evaluating correspondence between two shapes at a time. In some embodiments, evaluating correspondence can involve mapping shape-specific data about one shape to shape-specific data about the other shape, and optimizing the mapping based at least in part on a deformation energy of the mapping. One advantage of these and other embodiments is that they are not necessarily population based techniques; instead, some embodiments compute correspondence between two shapes in a training set at a time (as opposed to computing correspondence between all shapes in the training set at once). In some embodiments, one shape can function as a "fixed" or "master" shape, against which all other shapes (which may be referred to as "variable" shapes) in the set are compared.

Figure 1:
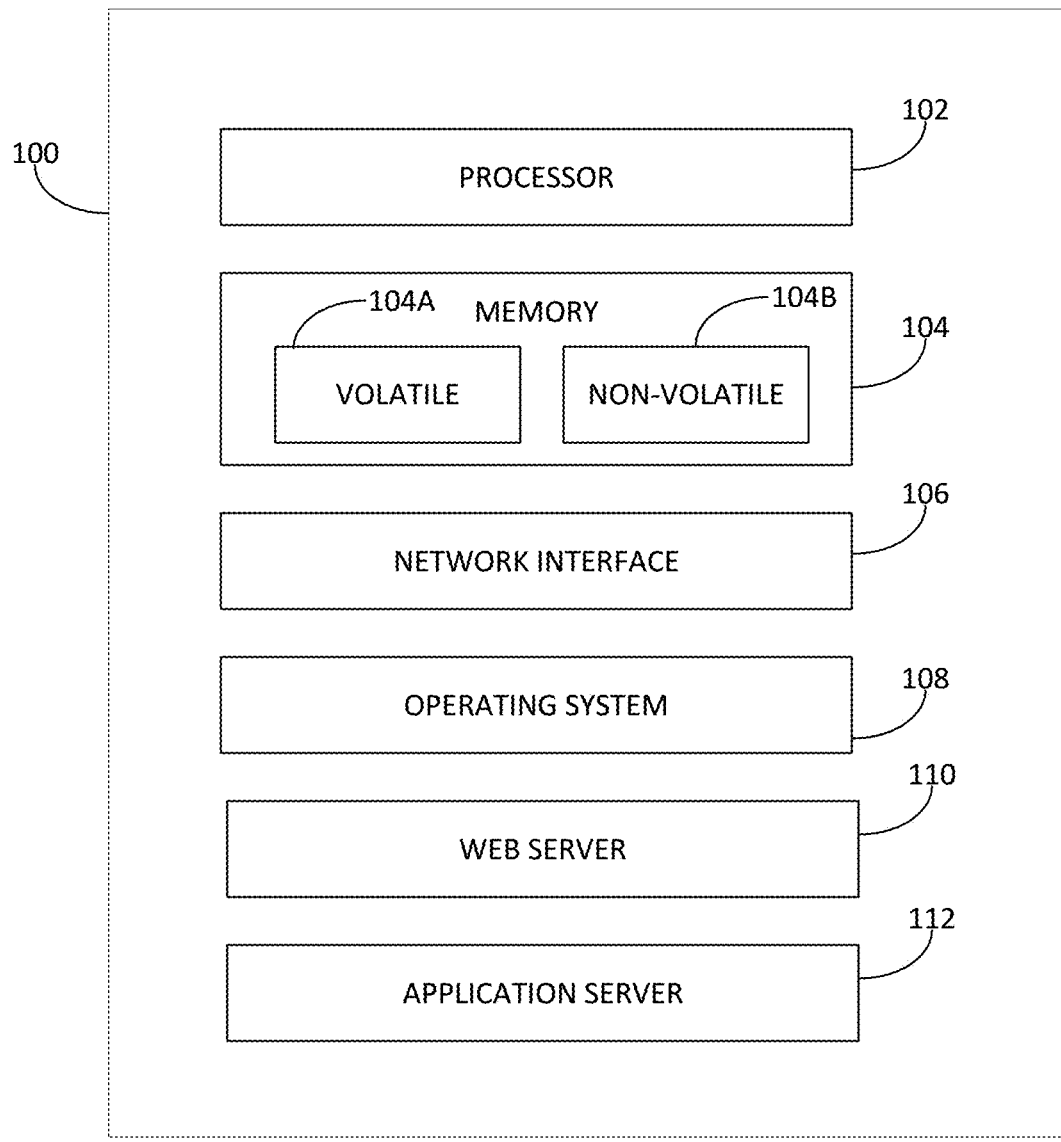
FIG. 1 is a block diagram of one example of a computing environment suitable for practicing various embodiments disclosed herein.

The systems and methods described herein may be implemented using one or more computer systems. Turning now to FIG. 1, an example is provided of a computer system 100 suitable for practicing various embodiments. The computer system 100 may generally take the form of computer hardware configured to execute certain processes and instructions in accordance with one or more embodiments described herein. The computer hardware may be a single computer or it may be multiple computers configured to work together. The computer system 100 includes a processor 102. The processor is generally configured to execute computer instructions to carry out certain tasks related to constructing a statistical shape model. The processor 102 may be a standard personal computer processor such as those designed and/or distributed by Intel, Advanced Micro Devices, Apple, ARM, or Motorola. The processor 102 may also be a more specialized processor tailored for image processing and analysis. The system 100 may also include memory 104. The memory 104 may include volatile memory 104A such as some form of random access memory. The volatile memory 104A may be configured to load executable software modules into memory so that the software modules may be executed by the processor 102 in a manner well known in the art. The software modules may be stored in a non-volatile memory 104B. The non-volatile memory 104B may take the form of a hard disk drive, a flash memory, a solid state hard drive or some other form of non-volatile memory. The non-volatile memory 104B may also be used to store non-executable data, such database files and the like.

The computer system 100 also may include a network interface 106. The network interface may take the form of a network interface card and its corresponding software drivers and/or firmware configured to provide the system 100 with access to a network (such as the Internet, for example). The network interface card 106 may be configured to access various different types of networks. For example the network interface card 106 may be configured to access private networks that are not publicly accessible. The network interface card 106 may also be configured to access wireless networks such using wireless data transfer technologies such as EVDO, WiMax, or LTE network. Although a single network interface card 106 is shown in FIG. 2, multiple network interface cards 106 may be present in order to access different types of networks. In addition, the network interface card 106 may be configured to allow access to multiple different types of networks.

An operating system 108 is also included in the computer system 100. The operating system 108 may be a well-known general operating system such as Linux, Windows, ChromeOS, or MacOS which is designed to provide a platform from which computer software applications may be executed by the processor 102. Alternatively, the operating system 108 may also be a special purpose operating system designed specifically for image processing and analysis applications. Still further, the operating system 108 may be a mobile operating system such as Android, Windows Mobile, or IOS.

Running on the operating system 108 may be web server software 130. The web server software 110 may be a standard off the shelf web server product such as Apache, Internet Information Server, or some other web server software. Alternatively, the web server may form a part of the operating system 108, or it may be a specialized HTTP server which is configured specifically to deliver image- or analysis-related web pages to browsing software via a network such as the Internet, or some other local area network or wide area network. The web server software 130 may be stored in the memory 104 for access by the processor 102 to execute on the operating platform provided by the operating system 108.

The computer system 100 may further include an application server 112. The application server 112 may include computer hardware and/or software which is configured to provide network-based applications which may run natively on the computer system 100, or be accessed via the web server 110, or both. The application server may be configured to allow for the distribution, use, and maintenance of a system for constructing a statistical shape model that will be discussed in detail below.

As mentioned above, a statistical shape model may be constructed from a set of training shapes. One of the more challenging steps in doing so is determining a set of corresponding points on each of the training shapes. In some cases, this can be done automatically (or semi-automatically) by giving each shape in the training set the same mesh structure (e.g., the same number of points and triangles, with the same connectivity, in such a way that corresponding points are located at what should be corresponding positions on each shape), and then moving the points over the surface of each shape until correspondence is satisfactory.

A mesh structure may be applied by parameterizing multiple shapes to a common base domain and remeshing this base domain. This can be a simple domain, such as a sphere or cylinder, or a more complicated domain, for example consisting of several patches. A spherical or cylindrical parameterization method is particularly suited for shapes that have spherical or cylindrical topology. For more complicated domains, a mesh structure can be applied using a template (e.g., a wireframe that is projected onto the shape and then remeshed) which is defined by already-identified landmarks. The identified landmarks can be, for example, manually indicated.

After the mesh structure is applied, correspondence between shapes can be evaluated. Generally, correspondence is evaluated by moving certain points in the mesh until they are in the appropriate place (which, in the case of anatomical models, can be defined by pre-defined landmarks or curves). How the evaluation is accomplished depends on the parameterization domain of the meshing. For the case of a spherical parameterization, points can be moved by defining a diffeomorphism from the sphere to the sphere. Defining a diffeomorphism provides a one-to-one and differentiable transformation, guaranteeing that there will be no overlapping or flipped triangles when moving the points.

A diffeomorphism can be defined in terms of point pairs and a path or trajectory connecting the two points. A point pair can include a start point and an end point. For a given set of point pairs, a diffeomorphism deforms the sphere (and, thus, the mesh structure on the sphere) in such a way that each start point is moved to its corresponding end point. The movement of the other points on the sphere depends on the trajectory between each start and end point of the given set of point pairs. The trajectory between each start and end point determines the movement of the other points on the sphere and, thus, the deformation energy of the mapping. The deformation energy is a measure of how large the deformation is: in one embodiment, the deformation energy can be assessed using the energy norm of the velocity field, i.e., the inner product of the velocity field with the vector Laplacian of the velocity field.

Figure 2A:
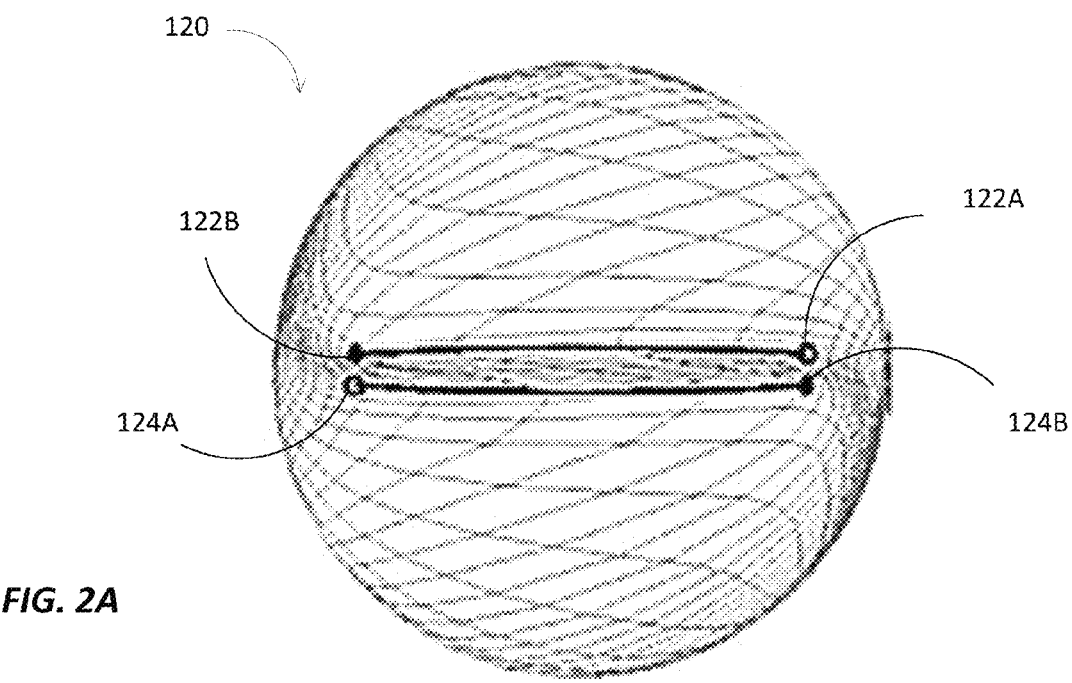
FIG. 2A is an illustration of one example of a diffeomorphism.
Figure 2B:
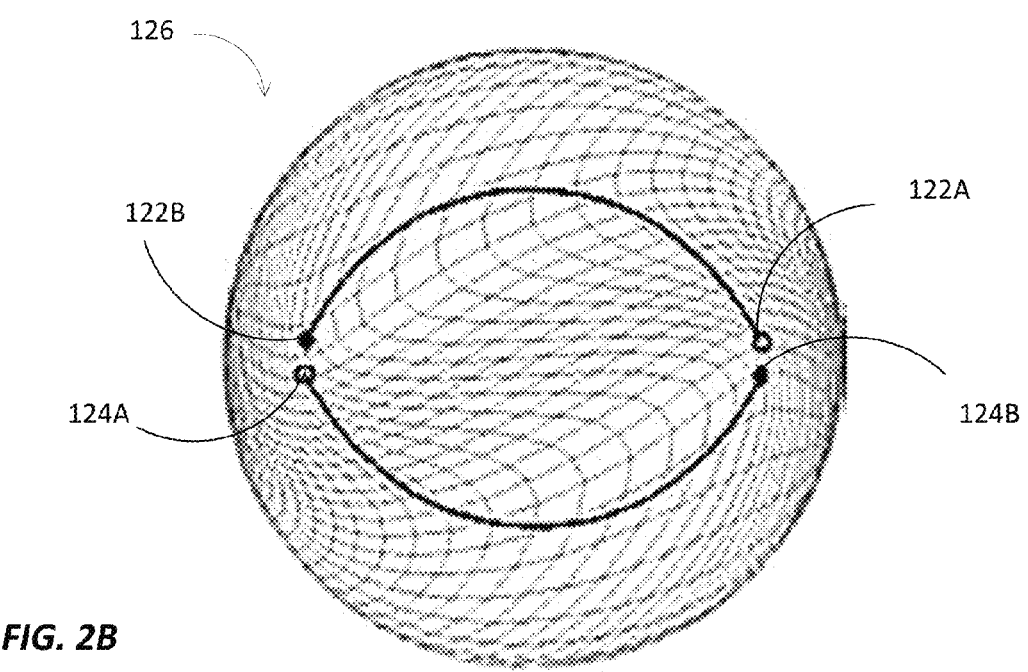
FIG. 2B is an illustration of another example of a diffeomorphism.

FIG. 2A, for example, shows a diffeomorphism 120 defined by two point pairs 122(a), 122(b) and 124(a), 124(b), with a shortest-path arc between the start points 122(a), 124(a) and the end points 122(b), 124(b). FIG. 2B, in contrast, shows a diffeomorphism 126 defined the same two point pairs 122(a), 122(b) and 124(a), 124(b), but with a different trajectory between the start points 122(a), 124(a) and the end points 122(b), 124(b). In FIG. 2B, the trajectories have been optimized to minimize the deformation energy. As can be seen by a comparison of these figures, the amount of deformation (and thus, the amount of deformation energy) is much larger in FIG. 2A than in FIG. 2B. The computational cost for computing the diffeomorphism and optimizing the deformation energy of the diffeormorphism can increase dramatically with the number of pairs.

Figure 3:
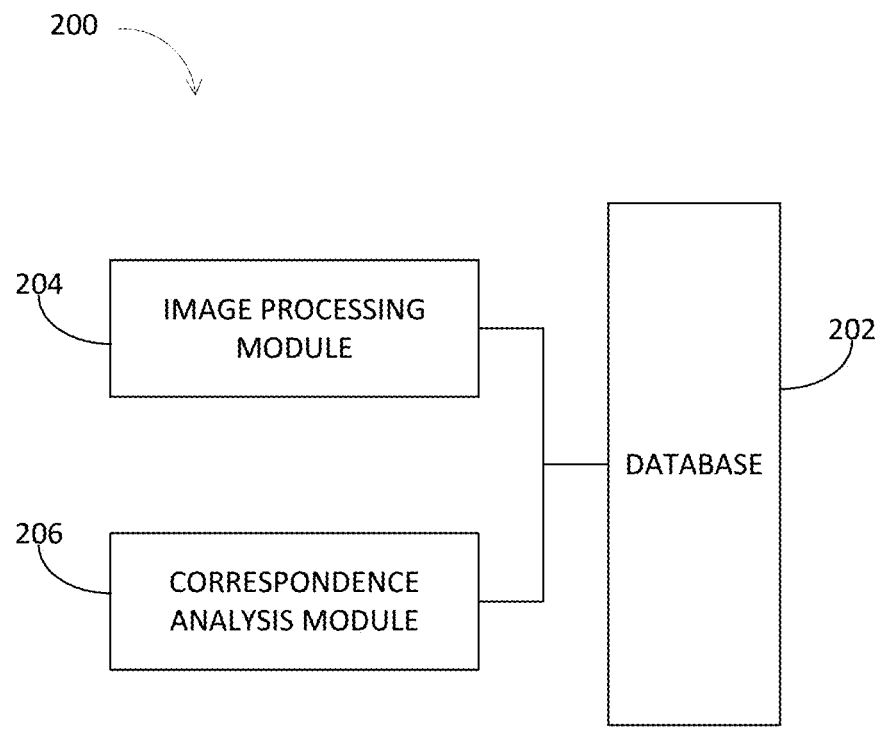
FIG. 3 is a high level system diagram of a computing system that may be used in accordance with one or more embodiments.

With reference now to FIG. 3, a computer-based system 200 for constructing a statistical shape model according to an embodiment is illustrated. The system 200 can include a database 202 which may be configured to perform various functions within the system 200, such as, for example, capturing, storing, and/or providing access for software applications and other devices to image data stored in the database. The database 202 may be a relational database, an object oriented database, an object relational database, or any other type of database suitable for performing its intended function. The database 202 can be configured to store raw 2D and/or 3D image data, such as, for example, medical image data from photographs, CT scans, MRIs, x-rays, and the like. The database 202 may include source- or patient-specific data (either anonymous or protected) which is related to image data stored in the database. The database 202 may also include shape-specific data about the images, such as, for example, information about landmark points and/or curves associated with the images. The landmarks can be manually indicated, for example by conversion engineers, or may be automatically indicated, for example by a computer-aided design ("CAD") or preprocessing tool, or simply by the location of a cut or section on the original shape (e.g., the intersection of a bone and a plane on which it is cut). In some embodiments, the image data can include a set of training shapes or training shape images for use in the construction of a statistical shape model. A set of training shapes can include any number of shapes or images. For example, a training set can include about 10, 50, 100, 500, or 1000 shapes, or a number of shapes less than, greater than, or within a range defined by any of these numbers.

As illustrated in FIG. 3, the system 200 may further include an image processing module 204 which is configured to analyze the 2D and/or 3D images in the database, as well as any shape-specific data associated with the images in the database, and perform various modeling functions in connection therewith. For example, the image processing module 204 can be configured to perform CAD, preprocessing, and/or meshing (e.g. triangulation) functions. In some embodiments, the image processing module 204 can be configured to perform parameterization, meshing, and remeshing functions with respect to the images. The image processing module 204 may take the form of a computing device having 3D image processing software installed in its operating system. The image processing module 204 may be comprised primarily or entirely of software, or it may be comprised of a combination of hardware and software. In some embodiments, the CAD design functionality may be provided by one software application, with the image preprocessing and/or meshing capabilities provided by a second, separate computer application. Alternatively, all of these functionalities may be provided in a single computer program.

As also illustrated in FIG. 3, the system 200 may further include a correspondence analysis module 206 which is configured to analyze the mesh structures applied to the images for correspondence. In some embodiments, the correspondence analysis module 206 can be configured to move (i.e., change the position of) points (e.g., selected vertices or landmarks) in an applied mesh structure. In some embodiments, such as, for example, embodiments employing spherical parameterization, the correspondence analysis module 206 can be configured to move points by defining a diffeomorphism from the sphere to the sphere. The diffeomorphism can be defined by points provided in the shape-specific data; e.g., the points may be points along the anatomical curves. The diffeomorphism can be defined by any suitable number of point pairs, e.g., 5, 10, 20, 30, 40, 50, or 100 point pairs, or a number of point pairs less than, greater than, or within a range defined by any of these numbers. In some embodiments, the correspondence analysis module 204 can also be configured to measure the deformation energy of the diffeomorphism. The correspondence analysis module 206 may be configured to receive meshed and/or otherwise processed image files from the image processing module 204. In still other embodiments, the image processing module 204 can be configured to act as the correspondence analysis module 206 in whole or part, e.g., by performing the functions of moving points in in an applied mesh structure, defining a mapping or diffeomorphism, and/or measuring deformation energy of a mapping or diffeomorphism.

The correspondence analysis module 206 may take the form of a computing device having specialized software installed in its operating system. The 3D correspondence analysis module 206 may be comprised primarily or entirely of software, or it may be comprised of a combination of hardware and software. In some embodiments, the correspondence analysis module may include a numerical computing system such as the MATLAB® environment available from MathWorks of Natick, Mass. Other numerical analysis software packages may be utilized.

It is to be appreciated that the system 200 described in FIG. 3 is merely one of many suitable environments in which the systems and methods disclosed herein may be practiced. A skilled artisan will readily appreciate that the system 200 may be connected to a computer network, or it may be standalone and isolated from any computer networks. Moreover, a skilled artisan will also appreciate that although the various components described in FIG. 1 are described separately, they may be functionally combined into fewer modules, or alternatively divided into additional modules.

Figure 4A:
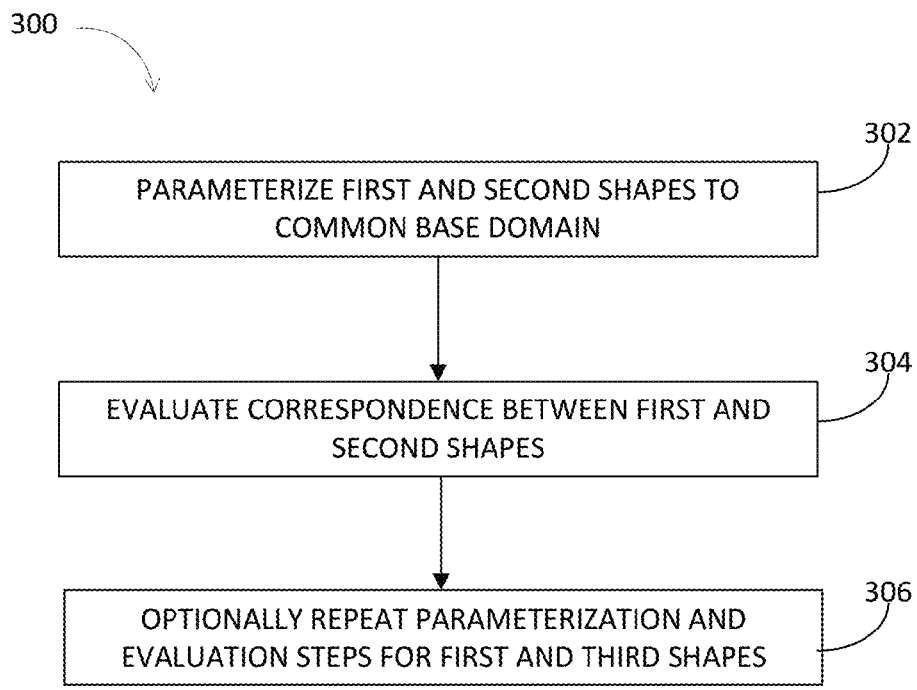
FIG. 4A is a flowchart illustrating a method of constructing a statistical shape model according to one or more embodiments.

FIG. 4A is a flowchart illustrating a method 300 of constructing a statistical shape model according to one or more embodiments. The method 300 begins at block 302, where first and second shapes or images in a set of training shapes or images are parameterized to a common base domain. Typically, these images will be stored in the database 202. Each of images can include shape-specific data, which may include, for example, landmark points and/or curves that were automatically or manually indicated. In some embodiments, the base domain can be a spherical domain, while in other embodiments, the base domain can have any other suitable 2D or 3D shape. For example and without limitation, the base domain can be circular, rectangular, spherical, cylindrical, polyhedral, or can have any other regular or non-regular 2D or 3D shape. In some embodiments, the first shape can be used as a "master" shape in the method 300, with subsequent parameterizations and correspondence analyses performed as between the first shape and a third shape, the first shape and a fourth shape, and so on, through some or all of the training set. In some embodiments, the first or "master" shape can be selected at random. In other embodiments, the first or "master" shape can be selected on the basis of certain criteria, such as, for example, identification by a practitioner as an average or representative shape. In still other embodiments, parameterizations and correspondence analyses can be performed as between various pairs of images in the training set, without necessarily establishing one image as a "fixed" or "master" shape.

In some embodiments, the first and second shapes can be referred to as "fixed" and "variable" shapes, respectively. In some embodiments, block 302 can include remeshing the first or fixed shape once to generate a first mesh, and allowing the vertices of that mesh to remain in position. Block 302 can also include remeshing the second or variable shape with the first mesh (i.e., with the same mesh as the first shape) to create a second mesh. In this way, each shape is parameterized to the sphere (or other common base domain) and then the sphere is given a new mesh which is transferred to the original shape through the parameterization of each shape.

Once the first and second shapes have been parameterized, the process moves to block 304. There, correspondence between the first and second shapes is evaluated. The evaluation can be based at least in part on the shape-specific data about the first shape and shape-specific data about the second shape. In some embodiments, the evaluation can include mapping shape-specific data from the second shape to the first shape. In an embodiment employing a spherical parameterization, the spherical curves (e.g., the anatomical curve information which is projected onto the shapes) can be mapped to each other using diffeomorphisms.

Figure 4B:
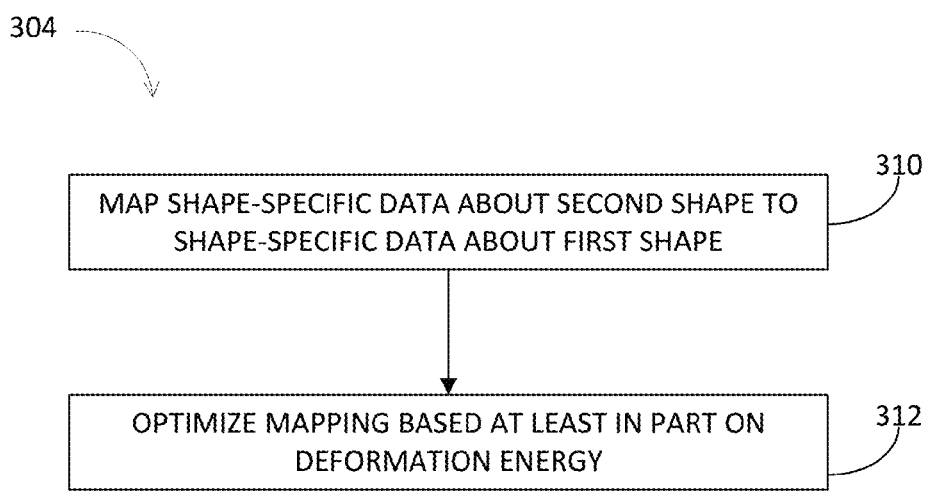
FIG. 4B is a flowchart illustrating sub-steps in a method of constructing a statistical shape model according to one or more embodiments.

With reference now to FIG. 4B, a flowchart is shown which illustrates sub-steps in block 304 according to one embodiment. As shown in block 304, evaluating correspondence can begin at block 310 with mapping shape-specific data about the second shape to shape-specific data about the first shape. In some embodiments, this mapping can include allowing the vertices of the first mesh to remain fixed in position, while moving some or all of the vertices of the second mesh over the second shape. In some embodiments, the points or vertices can be moved until the deformation energy is minimized (i.e., until the mapping having the lowest deformation energy is established). The position(s) corresponding to that minimum can establish the final correspondence for the points on the curves.

For example, in some embodiments, if points along curve(s) of the second shape are moved to points along the curve(s) of the first shape, the vertices of the second shape will also move, in a manner defined by the mapping. In embodiments employing a spherical parameterization, evaluating correspondence can include defining a diffeomorphism based on shape specific data such as, for example, points along anatomical curves and/or landmark points. Thus, in some embodiments, rather than necessarily determining correspondence between two 3-dimensional shapes, correspondence between two closed curves (e.g., anatomical curves or other shape-specific data) can be evaluated. To evaluate correspondence between closed curves, each curve can be sampled in a small number of points. For example, in some embodiments, each curve can be sampled in 2, 3, 4, 5, 10, 20, 30, 40, or 50 points, or any number of points greater than, less than, or within a range defined by any of these numbers.

The process can then move to block 312, where the mapping can be optimized based at least in part on a deformation energy of the mapping. In some embodiments, the mapping with the lowest deformation energy can be considered the optimized mapping. In embodiments, optimization variables can include the starting point of each curve and the spacing between points along each curve. In embodiments employing a spherical parameterization, the optimization function can measure the deformation energy of the sphere for the diffeomorphism defined by the point pairs. The diffeomorphism that yields the lowest deformation energy can be used to define correspondence, as a close approximation of actual anatomical correspondence. In cases of incomplete results, additional shape-specific data (e.g. landmark points) can be used to help determine correspondence.

Referring back now to FIG. 4A, once correspondence is evaluated between the first and second shapes, the process 300 can be repeated at block 306 with the first and a third shape, and then with the first and a fourth shape, and so on, through some or all of the shapes in the training set. It will be understood by those of skill in the art that block 306, when performed as between first and third or subsequent shapes, need not repeat the parameterization of the first shape; instead, the third and subsequent shapes need only be parameterized to the same base domain as the first shape.

Techniques and algorithms that can be used to implement the method 300 can include multi-resolution representation of triangulated surfaces to perform the spherical parameterization, Chebyshev barycentric interpolation to parameterize optimization trajectories, adaptive Clenshaw-Curtis quadrature to compute the integrals defining the deformation energy, Chebyshev differentiation matrices and spectral methods for solving the ordinary differential equations that arise from the velocity field governing the movement of particles on the sphere, near-best rational Carathéodory-Féjer approximation to efficiently compute the reproducing kernel of the spherical tangent vector Hilbert space, trigonometric least squares approximation of curve points to obtain a continuous representation, generic representation of closed curve reparameterization based on imaginary poles, Nelder-Mead and quasi-Newton optimization. Additional techniques are described in "Landmark Matching via Large Deformation Diffeomorphisms on the Sphere" by Glaunes et al., Journal of Mathematical Imaging and Vision 20:179-200, 2004, Kluwer Academic Publishers, Netherlands, the content of which is hereby incorporated by reference in its entirety.

Although the embodiments described above generally employ closed curves in evaluating correspondence, some embodiments can utilize any combination of closed curves, open curves, and landmark points as shape-specific data to help define correspondence. For example, some embodiments can evaluate correspondence on the basis of landmark points only; i.e., in one embodiment, a method for constructing a statistical shape model can include computing a diffeomorphism defined by landmark points only.

Figure 5A:
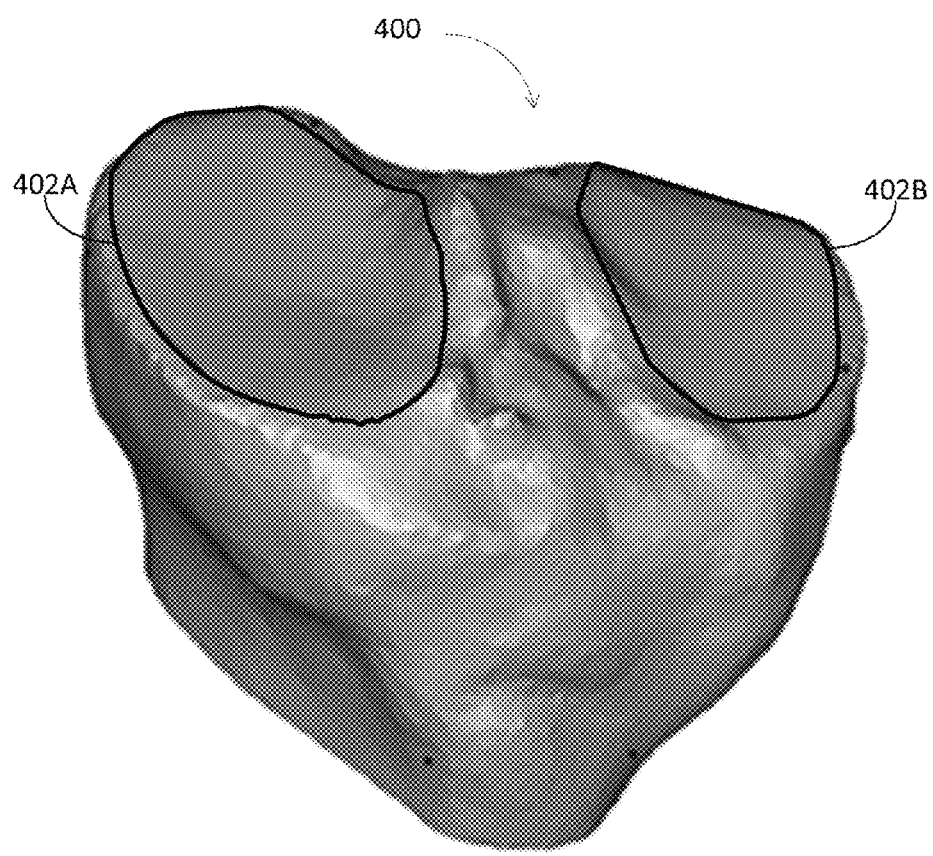
FIG. 5A is an example of an image of a training shape having shape-specific data projected thereon, suitable for use with various embodiments.
Figure 5B:
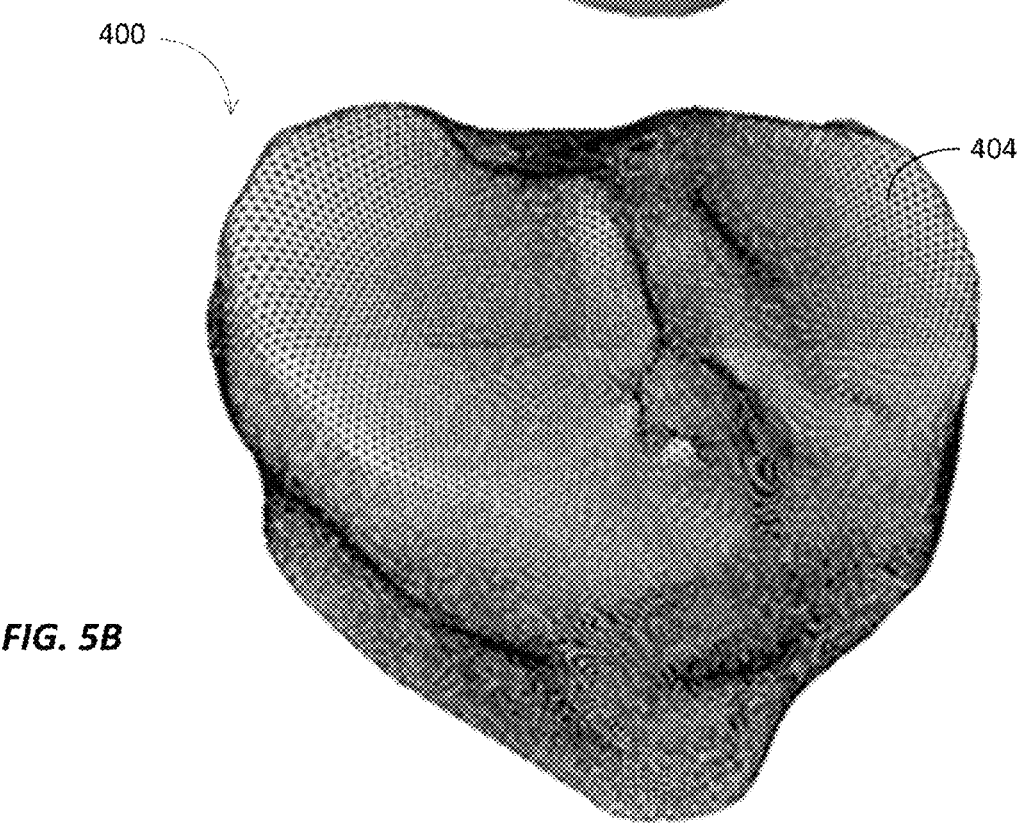
FIG. 5B shows the training shape of 5A having been meshed in accordance with an embodiment.
Figure 5C:
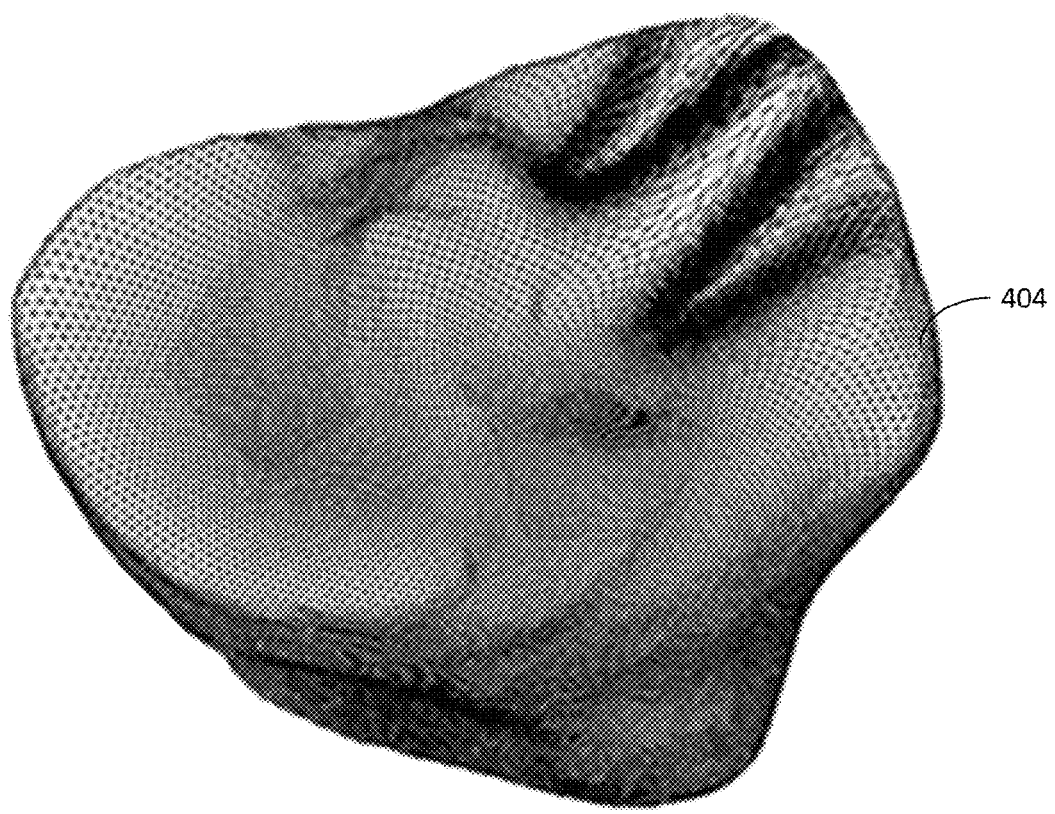
FIG. 5C shows a second shape having been meshed with the same mesh as the training shape of 5B, illustrating an example of incorrect correspondence between training shapes.

Certain steps in a method of constructing a statistical shape model will be described now in connection with FIGS. 5A, 5B, and 5C. FIG. 5A shows an example of a first shape 400 (in this case, an end of a tibia) having anatomical curves 402A, 402B projected thereon. In this case, the curves 402A, 402B were indicated by conversion engineers and projected onto the raw image data of the tibia. FIG. 5B shows an example of a mesh 404 applied to the first shape 400. FIG. 5C shows an example of the mesh 404 applied to a second shape 406 in a situation where the deformation energy was not minimized; as shown in FIG. 5C, such an example results in an incorrect correspondence for at least the tibial plateau on the right of this second shape.

Figure 6:
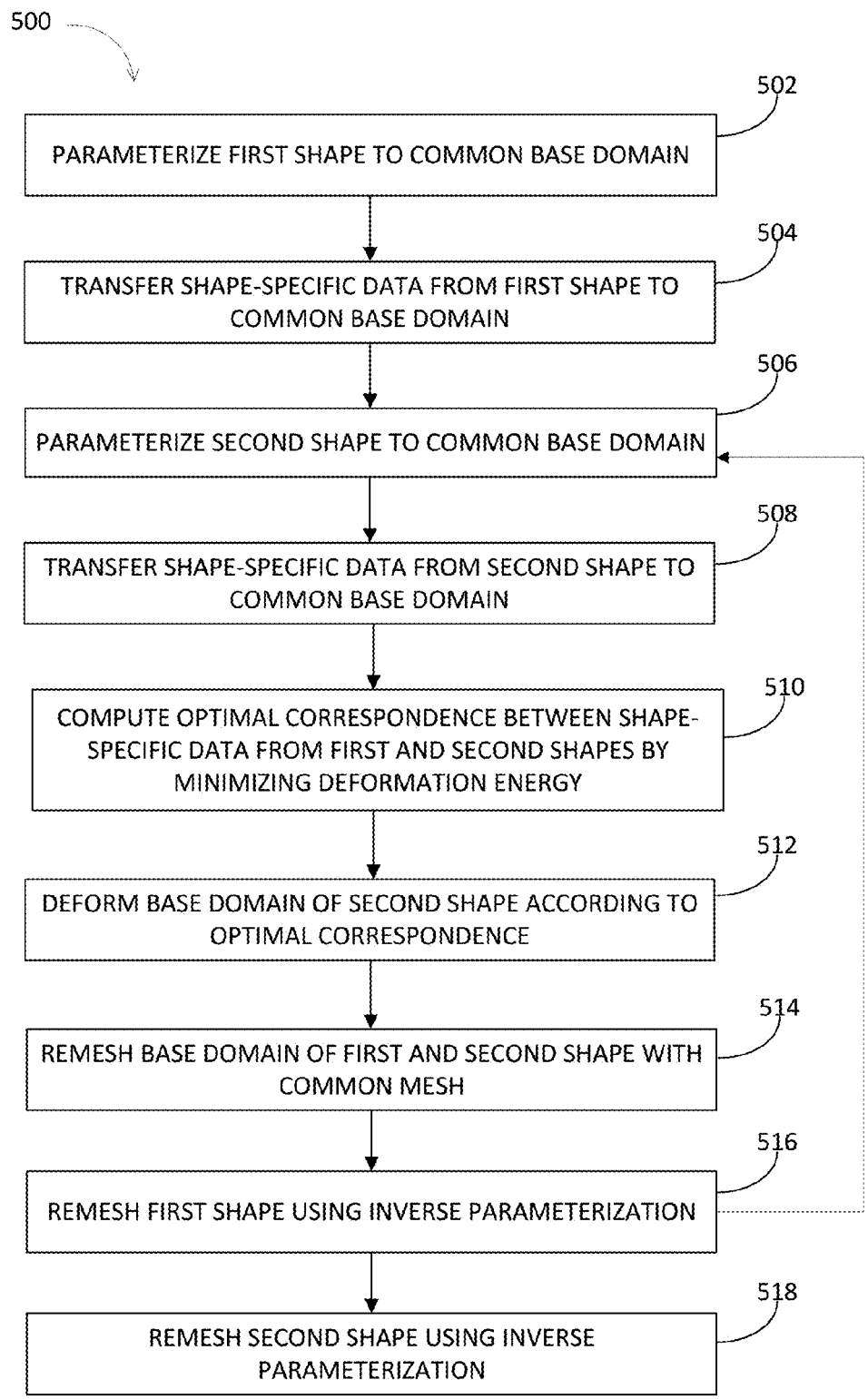
FIG. 6 is a flowchart illustrating another method of constructing a statistical shape model according to one or more embodiments.

With reference now to FIG. 6, another method 500 of constructing a statistical shape model is illustrated. As shown in block 502, the process 500 can begin with parameterizing a first shape to a base domain. The process 500 can then move to block 504, at which shape-specific data about the first shape can be transferred to the base domain. At block 506, the process can involve parameterizing a second shape to the same base domain. The process can then move to block 508, at which shape-specific data about the second shape can be transferred to the common base domain. The process can then move to block 510, at which correspondence between the first and shapes can be evaluated; e.g., the optimal correspondence between the shape-specific data from the first and second shapes can be computed by minimizing the deformation energy. Next, at block 512, the base domain of the second shape can be deformed according to the optimal correspondence to produce a mesh. At block 514, the base domain of the first and second shape can be remeshed with the same mesh. At block 516, the first shape can be remeshed, for example using inverse parameterization. At block 518, the second shape can be remeshed, for example using inverse parameterization. In embodiments, blocks 506 through 516 can be repeated with third, fourth, and subsequent shapes, throughout an entire set of training shapes, if desired. Although illustrated with blocks 502 through 518 shown in a particular order, the order of various steps can vary in embodiments, and certain steps can be accomplished simultaneously if desired.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system for constructing a statistical shape model from a set of training shapes, the system comprising:
   a database configured to store a set of training shape images;
   an image processing module configured to parameterize a first shape and a second shape in the set of training shapes to a common base domain; and
   an analysis module configured to evaluate correspondence between the first and second shapes using shape-specific data about the first shape and shape-specific data about the second shape, wherein evaluating correspondence comprises mapping the shape-specific data about the second shape to the shape-specific data about the first shape, and optimizing the mapping based at least in part on a deformation energy of the mapping.

2. The system of claim 1, wherein the common base domain is spherical.

3. The system of claim 1, wherein evaluating correspondence comprises defining a diffeomorphism.

4. The system of claim 1, wherein the shape-specific data include anatomical information.

5. The system of claim 1, wherein the shape-specific data include curves.

6. The system of claim 5, wherein the curves are closed curves.

7. The system of claim 1, wherein the shape-specific data include points.

8. The system of claim 1, wherein the shape-specific data include curves and points.

9. The system of claim 1, wherein:
the image processing module is further configured to parameterize a third shape in the set of training shapes to the common base domain; and
the analysis module is further configured to evaluate correspondence between the first and third shapes using shape-specific data about the first shape and shape-specific data about the third shape, wherein evaluating correspondence comprises mapping the shape-specific data about the third shape to the shape-specific data about the first shape, and optimizing the mapping based at least in part on a deformation energy of the mapping.

10. A computer implemented method of constructing a statistical shape model from a set of training shapes, the method comprising:
parameterizing a first shape and a second shape in the set of training shapes to a common base domain; and
evaluating correspondence between the first and second shapes using shape-specific data about the first shape and shape-specific data about the second shape,
wherein evaluating correspondence comprises:
mapping the shape-specific data about the second shape to the shape-specific data about the first shape, and
optimizing the mapping based at least in part on a deformation energy of the mapping.

11. The computer implemented method of claim 10, wherein mapping the shape-specific data comprises defining a diffeomorphism.

12. The computer implemented method of claim 10, wherein the common base domain is spherical.

13. The computer implemented method of claim 10, wherein the shape-specific data include anatomical information.

14. The computer implemented method of claim 10, wherein the shape-specific data include curves.

15. The computer implemented method of claim 14, wherein optimizing the mapping is based at least in part on points sampled from each curve.

16. The computer implemented method of claim 14, wherein the curves are closed curves.

17. The computer implemented method of claim 10, wherein the shape-specific data include points.

18. The computer implemented method of claim 10, wherein the shape-specific data include curves and points.

19. The computer implemented method of claim 10, further comprising repeating the parameterizing and evaluating steps for the first shape and a third shape in the set of training shapes.

20. A non-transitory computer readable medium comprising computer executable instructions stored thereon which when executed by a processor cause a computer to perform a method of constructing a statistical shape model from a set of training shapes, the method comprising:
parameterizing first and second shapes in the set of training shapes to a common base domain; and
evaluating correspondence between the first and second shapes using shape-specific data about the first shape and shape-specific data about the second shape,
wherein evaluating correspondence comprises:
mapping the shape-specific data about the second shape to the shape-specific data about the first shape, and
optimizing the mapping based at least in part on a deformation energy of the mapping.

* * * * *